Patented Feb. 17, 1925.

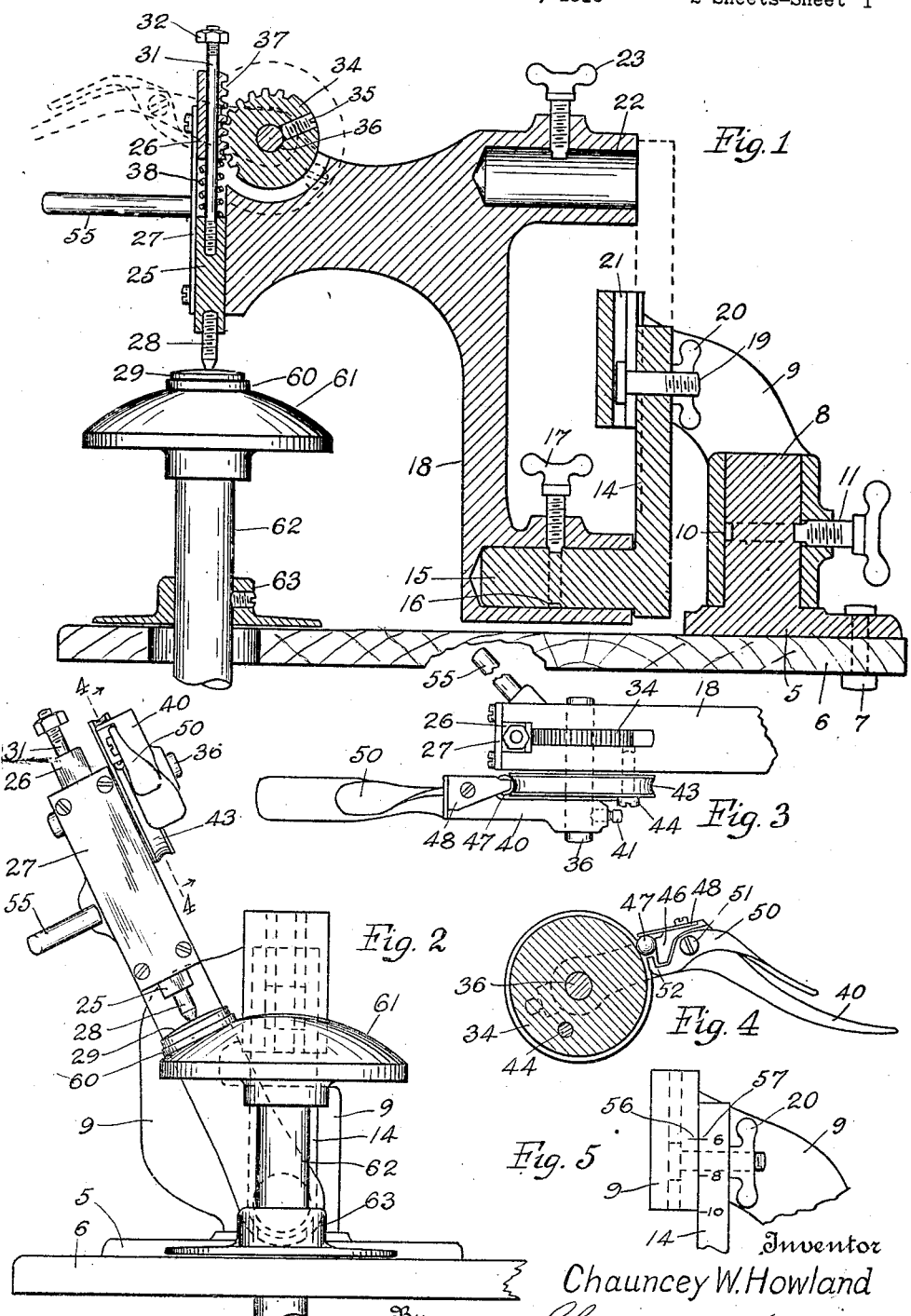

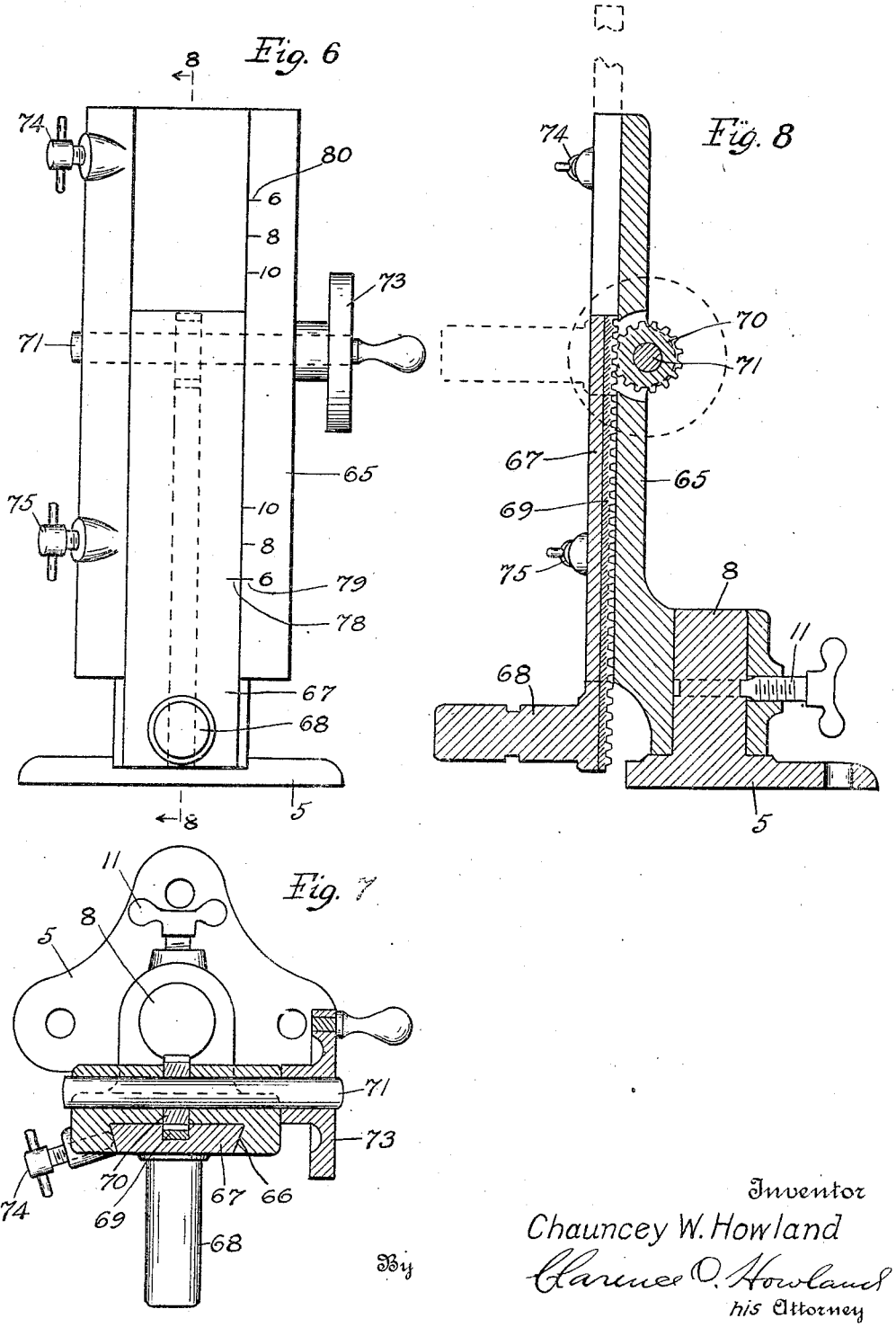

1,527,045

UNITED STATES PATENT OFFICE.

CHAUNCEY W. HOWLAND, OF GENEVA, NEW YORK, ASSIGNOR TO H. J. STEAD, OF GENEVA, NEW YORK.

LENS-SURFACING MACHINE.

Application filed July 18, 1919. Serial No. 311,825.

*To all whom it may concern:*

Be it known that I, CHAUNCEY W. HOWLAND, a citizen of the United States, residing at Geneva, in the county of Ontario and State of New York, have invented certain new and useful Improvements in Lens-Surfacing Machines, of which I declare the following to be a full, clear, and exact description.

This invention relates to machines for grinding and polishing the surfaces of lenses commonly termed surfacing.

The general type of lens surfacing machine now in common use provides for the rotation of the grinding tool or lap on the end of a vertical spindle and for the oscillation of the lens across the face of the lap by a hand lever which is pivoted at one end. While adjustments are provided in those machines whereby the pin connecting the lever and lens block may be raised and lowered, no provision is made for causing the body of the pin to describe the arc of a circle concentric with the arc of the lap, but on the contrary the pin moves across the face of the lap in fixed angular relation. This has caused uneven pressure on the lens and interferes with the perfect operation of the machine. I aim to overcome this disadvantage by providing means whereby the pin which presses the lens against the tool shall describe an arc having the same center as the tool so that pressure applied to the lens shall at all times be radial to the surface of the tool and be the same in amount, whether the lens is near the center of the tool or near an edge of the same.

An object of my invention is to provide a lens surfacing machine, which is simple and durable in construction and efficient in operation on both strong and weak lenses.

Another object is to provide such a machine which can be quickly and easily adjusted to grind or polish convex and concave lenses of either strong or slight curvature, as well as flat lenses.

A further object is to provide such a machine in which the pressure between the lens and the tool against which it is being ground or polished may be kept constant regardless of the relative position of the lens and tool.

A further object is to provide means for applying pressure between the lens and the tool which shall be directed in a line radial to the face of the tool and the amount of which may be readily adjusted and held at any desired value.

Further objects of this invention will be apparent from the detailed description to follow. I accomplish the objects of my invention in one instance by the devices and means described in the following specification, but it is evident that the same may be varied widely without departing from the scope of the invention as pointed out in the appended claims. A structure constituting an embodiment of my invention is illustrated in the accompanying drawing, forming a part hereof, in which:

Figure 1 is a longitudinal, vertical, sectional view of the machine with the parts in position for surfacing a concave lens.

Fig. 2 is an elevation of the machine showing the oscillatable lens guiding frame swung to the left.

Fig. 3 is a fragmentary top plan view of the machine.

Fig. 4 is a sectional view taken on a line 4—4 of Fig. 2.

Fig. 5 is a fragmentary elevation corresponding to Fig. 1 showing the index marks on the two supporting brackets for the frame.

Figs. 6 and 7 are respectively a front elevation and a sectional view of a modification.

Fig. 8 is a sectional view of the same, taken on the line 8—8 of Fig. 6.

Referring to the drawing, a base 5 secured to any suitable support, such as a bench 6 by means of bolts 7, has an upstanding circular post 8 upon which is pivoted a bracket 9. This post 8 is provided with an annular groove 10 into which engages the end of a set screw 11 whereby the bracket 9 is retained on the base member 5, and whereby it may be rigidly secured in any desired position by tightening the screw 11. The bracket 9 has adjustably secured to it a second bracket 14 which bracket has at one end a cylindrical post 15 which like the post 8 has an annular groove 16 formed in its periphery into which engages a set screw 17, carried by the frame 18. The frame has an opening to receive post 15 and form a bearing thereon. By means of this connection the frame 18 may oscillate about the post 15 being retained thereon by the set screw 17, and by tightening this screw the frame may be held firmly in any desired position. The bracket 14 carries a bolt 19, having a nut 20 whose head engages in a T-shaped slot 21 formed in the bracket 9. It will be noted from Figs. 1 and 2 that the bracket 9 has a somewhat spiral form so as to provide sufficient clearance for the bracket 14. By means of this connection the bracket 14 may be adjusted vertically on the bracket 9, and may be secured thereto, either depending from the bolt as shown in full lines in Fig. 1, or in an upright position as indicated by dotted lines in which position the post 15 engages in a second similar opening 22. A screw 23 similar to screw 17 is provided to engage the groove 16 when the bracket 14 is in an upright position, and by this screw 23 the frame 18 may be retained on the post 15, or secured to the bracket 14 in any desired position.

The forward portion of the frame 18 is shaped to receive in sliding engagement two square rods 25 and 26, a plate 27 secured to the front face of the frame serving to retain them in proper position. The rod 25 has threaded into it a pin 28 having a point engaging a recess into a lens mounting block 29 and serves to guide the lens over the face of the lap. Into the opposite end of the rod 25 is threaded a rod 31 which extends up through and has sliding engagement with the rod 26. A nut 32 threaded on the upper end of the rod 31 engages the rod 26 to limit the downward movement of the rod 25. A gear wheel 34 or segment thereof, having a set screw 35, is rigidly mounted on a shaft 36 journaled in the frame 18 and is adapted to engage teeth 37 cut in the adjacent side of the rod 26 to thereby vary the tension of a small compression spring 38 interposed between the two rods, 25 and 26. The gear wheel 34 is operated by means of a lever 40 secured to the shaft 35 by a set screw 41 and this lever is adapted to be automatically held in adjusted position by means of the clutch device, now to be described. This clutch device comprises a grooved wheel 43 through which the shaft 35 extends loosely, and which is held against movement by a screw 44 threaded into the frame 18. The lever 40 has a lateral extension 46 having a face opposite the periphery of the grooved wheel 43 which face and adjacent portion of the periphery of the wheel form a wedge shaped cavity. A ball 47, having a wedging engagement in this cavity, prevents the lever from moving in a direction to relieve the pressure on the spring 38. A small, flat spring 48 attached to the upper portion of the lever 40 serves to retain the ball in its place. To permit raising the lever 40 to relieve pressure upon the spring 38, a second lever 50 is provided. This lever 50 is pivotally attached to lever 40 by a screw 51 and has an extension 52 which is adapted to engage the under side of the ball to lift it out of wedging position. To avoid the possibility of breaking the spring 48 by too great pressure exerted on the lever 50, the extension 46 of lever 40 is shaped to provide a stop for lever 50.

A handle 55 is provided extending forwardly and laterally from the front portion of the frame 18 by means of which the frame may be oscillated.

In order that the frame and pin shall swing in an arc concentric with the center of curvature of the tool, the bracket 9 is provided with an index mark 56 and the bracket 14 is provided with several index marks 57, Fig. 5 showing three such marks, marked respectively "6," "8" and "10." These marks refer to the strength of the lens being surfaced, for example, 6, 8 and 10 diopters. The opposite side of the bracket 14 is also provided with similar index marks which are adapted to be brought into register with the index mark 56 when a convex lens is being surfaced.

The lens holding block 29 is shown carrying a lens 60 being surfaced by the tool or lap 61, having a convex surface. This tool 61 is mounted in the usual manner upon a spindle 62 extending up through the bench 6 and is shown carrying a protective flanged collar 63. The means for mounting and rotating the spindle 62 forms no part of this invention, being common construction, and is therefore not shown.

In operation supposing it is desired to grind or polish a concave lens, the machine is set up in the manner illustrated by Fig. 1, the bracket 14 engaging the frame 18 in the lower bearing. The screw 11 is tightened with the portion 21 of bracket 8 facing the tool, and the bracket 14 adjusted with the index mark on bracket 9 opposite the appropriate index mark on bracket 14 corresponding to the lens to be ground. The pin 28 is inserted in the opening in block 29 and the lever depressed to suitably tension the spring 38. This lever having been once adjusted will cause the lens to bear upon the lap with an unvarying pressure throughout the grinding and polishing operation and regardless of the position of the lens on the lap. The tool 61 is rotated by any suitable means and the frame 18 is oscillated back and forth about the post 15 as a center, the lens being thereby carried back and forth over the surface of the tool. Since the center of oscillation has been set to coincide with the center of curvature of the tool, the pressure of the pin 28 will at all times be radial to that surface and the tension will be constant.

If desired the frame may be secured in a tilted position, such for example, as shown in Fig. 2, by tightening the screw 17 it being possible to clamp the bracket in any position desired so that the lens may be held in whatever position relative to the tool, it may be found that the best results are produced. Practice has shown that it is very desirable to vary the position of the lens on the tool in order that the tool may be worn down evenly and the original curvature retained. In polishing it is sometimes found that the lens may polish at the center or at the edge, in which case it would be desirable to hold the lens in such position as to cause it to polish evenly over the entire surface. In such event the position may be selected and the bracket clamped so that it will polish in the desired position, clamping of the bracket moreover will allow the machine to operate while the operator gives his attention to other machines.

When it is desired to surface a convex lens, the bracket 14 is secured to the bracket 9 in its upright position, such being indicated by dotted lines in Fig. 1, and these two brackets adjusted relative to each other with their alining index marks corresponding, as in the case of a concave lens, with the degree of curvature of the tool or lap. As so arranged the frame 18 may be oscillated about the bearing 22 as a center.

When it is desired to surface a flat lens or one whose curvature is less than 6 diopters, the frame 18 and the two brackets are all secured rigidly together by tightening the appropriate screws and upon loosening the set screw 11, the entire organization is oscillated in a horizontal plane about the post 8 as a center. As in the case of surfacing convex and concave lenses the lens may be oscillated back and forth over the lap or the set screw 11 may be tightened to hold the lens in any desired position.

In the modification illustrated by Figs. 6, 7, and 8 there is shown a bracket 65 corresponding to the bracket 14 and pivotally supported on the base member 5. This bracket is retained upon and may be fixedly secured to the post 8 of the base member by means of the screw 11 as in the previously described form. The bracket 65 is provided with a groove 66 on its front face in which slides a second bracket 67 carrying at its lower extremity a pivot post 68 corresponding to the pivot post 15. The bracket 67 is provided on its rear face with a longitudinal groove in which is mounted and secured a rack 69 and this rack meshes with a small pinion 70 mounted upon a shaft 71 having bearings in the bracket 65. Upon one end of the shaft 71 is mounted a hand wheel 73 by means of which the pinion may be rotated and the bracket 67 raised and lowered. In order to fix the bracket 67 in any desired position the bracket 65 is provided with two set screws 74 and 75 which when tightened engage the side of the bracket 69 to prevent movement thereof, the lower set screw 75 being adapted for use when the bracket 69 is in its lowered position as shown in full lines by Figs. 6 and 8, and the set screw 74 being adapted for use when the bracket is raised to the position indicated by dotted lines in Fig. 8. When the bracket 67 is in its lowered position the post 68 is adapted to enter the lower bearing of the frame 18 for use in surfacing concave lenses. To surface a convex lens the hand wheel is rotated to raise the bracket 67 sufficient to bring the post 68 into alinement with the upper bearing 22 of the frame 18. To provide for the proper setting of the bracket 67 it is provided with an index mark 78 which, when the bracket 67 is in position for surfacing concave lenses, may be brought to register with appropriate index mark 79 on the face of the bracket 65. With the parts in position for surfacing convex lenses the index mark 78 may be brought to register with the appropriate index mark 80 also on the face of the bracket 65.

While I have described my invention in more or less detail, and as being embodied in certain precise forms I do not desire or intend to be limited thereto, as on the contrary my invention contemplates broadly all proper changes, as well as the omission of immaterial elements and the substitution of equivalents therefor, as circumstances may suggest or necessity render expedient.

Having thus described my invention, what I claim as new and desire to secure by Letters Patent, is:

1. In a lens grinding and polishing machine, the combination of a rotatably mounted tool, a lens guiding frame, a bracket for supporting said frame, said frame being constructed to pivotally engage said bracket at either one of two points located respectively above and below said tool to swing in a plane parallel with the axis of said tool, a base member, a second bracket pivoted to said base member to swing in a plane at right angles to the axis of said tool and adjustably secured to said first mentioned bracket to vary the effective radius of movement of the lens guided by said frame, means for rigidly securing said frame to said first bracket when the frame is to be swung in the last mentioned plane and means for rigidly securing said second bracket to said base member when said frame is to be swung in the first mentioned plane.

2. In a lens surfacing machine, the combination of a frame, a member having a sliding engagement with said frame for pressing a lens against a surfacing tool, a lever pivoted to said frame for sliding said member, a member carried by said frame having a surface concentric with the pivotal point of said lever, said lever having a surface adjacent said concentric surface and forming a wedge shaped chamber therewith, a ball in said chamber and a device carried by said lever for releasing said ball from wedging engagement.

3. In a lens surfacing machine having a tool against which a lens is adapted to be surfaced, the combination of a frame, a member slidable in said frame adapted to press said lens against said tool, a rack constructed to slide in said frame, a compression spring between said member and said rack, a gear wheel pivoted in said frame, a hand lever operatively connected to said gear wheel, a second member secured to said frame having a surface concentric with the axis of said gear, said lever having a portion forming a tapered recess with said second member, a ball in said recess and a second lever carried by said first lever for releasing said ball from wedging position.

4. In a lens surfacing machine, the combination of a rotatably mounted tool, a lens guiding frame having a pair of apertures adapted to form bearings and located respectively above and below said tool, a two part bracket having one part provided with a pivot pin, means whereby said part may be adjusted to raise and lower said pivot pin to engage one or the other of said apertures, means for rigidly securing said frame to said pivot pin, means for pivotally supporting said bracket to swing in a plane at right angles to the axis of said tool and means for holding said bracket immovable.

5. In a lens surfacing machine, the combination of a surfacing member, a lens holding member, a frame for moving one of said members relative to the other, said frame having a pair of bearing sockets whose axes lie respectively above and below said surfacing member and extend at right angles to the axis thereof, a supporting device for said frame having a member carrying a post adapted to fit said sockets and means whereby said last member may be adjusted to cause it to engage either the one or the other of said sockets is desired.

6. In a lens surfacing machine, the combination of a rotatably mounted surfacing tool, a lens carrying member, a frame for moving said lens carrying member across the face of said tool, said frame having a pair of fixed bearing sockets whose axes lie respectively above and below the face of said tool and which extend at right angles to the axis of rotation thereof, a device for pivotally supporting said frame comprising a post adjustable to be inserted in said lower socket for surfacing concave lenses and in said upper socket for surfacing convex lenses.

7. In a lens surfacing machine, the combination of a surfacing tool mounted to rotate upon a vertical axis, a lens guiding frame having means for resiliently pressing a lens against said tool and having a pair of horizontal bearing sockets located respectively above and below the plane of said tool, a bracket having a post adapted to engage in either of said sockets, a base having a vertical bearing post, a second bracket pivoted on said bearing post and having an adjustable connection with said first bracket to permit the latter being raised and lowered and inserted in the one or the other of said sockets, a set screw for clamping together said base and said second bracket when the frame is to be swung about said first post and a set screw for clamping together said frame and said first post when the frame is to be swung about said base post.

8. In a lens surfacing machine, the combination of a rotatably mounted surfacing lap, a lens guiding frame, a supporting device for said frame pivotally mounted on an axis parallel with the axis of said lap, said frame having two fixed sockets located respectively above and below said lap and said device comprising a relatively adjustable part adapted to be shifted to pivotally engage in one or the other of said sockets.

In testimony whereof I affix my signature.

CHAUNCEY W. HOWLAND.